Aug. 31, 1965  G. W. McCARTY ETAL  3,203,742
BEARING MEANS FOR POWER-OPERATED DEVICE
Filed Dec. 17, 1962  2 Sheets-Sheet 1

INVENTOR
GEORGE W. McCARTY
JOHN J. TEIGE

BY *Leonard Bloom*

ATTORNEY

Aug. 31, 1965        G. W. McCARTY ETAL        3,203,742
            BEARING MEANS FOR POWER-OPERATED DEVICE
Filed Dec. 17, 1962                              2 Sheets-Sheet 2
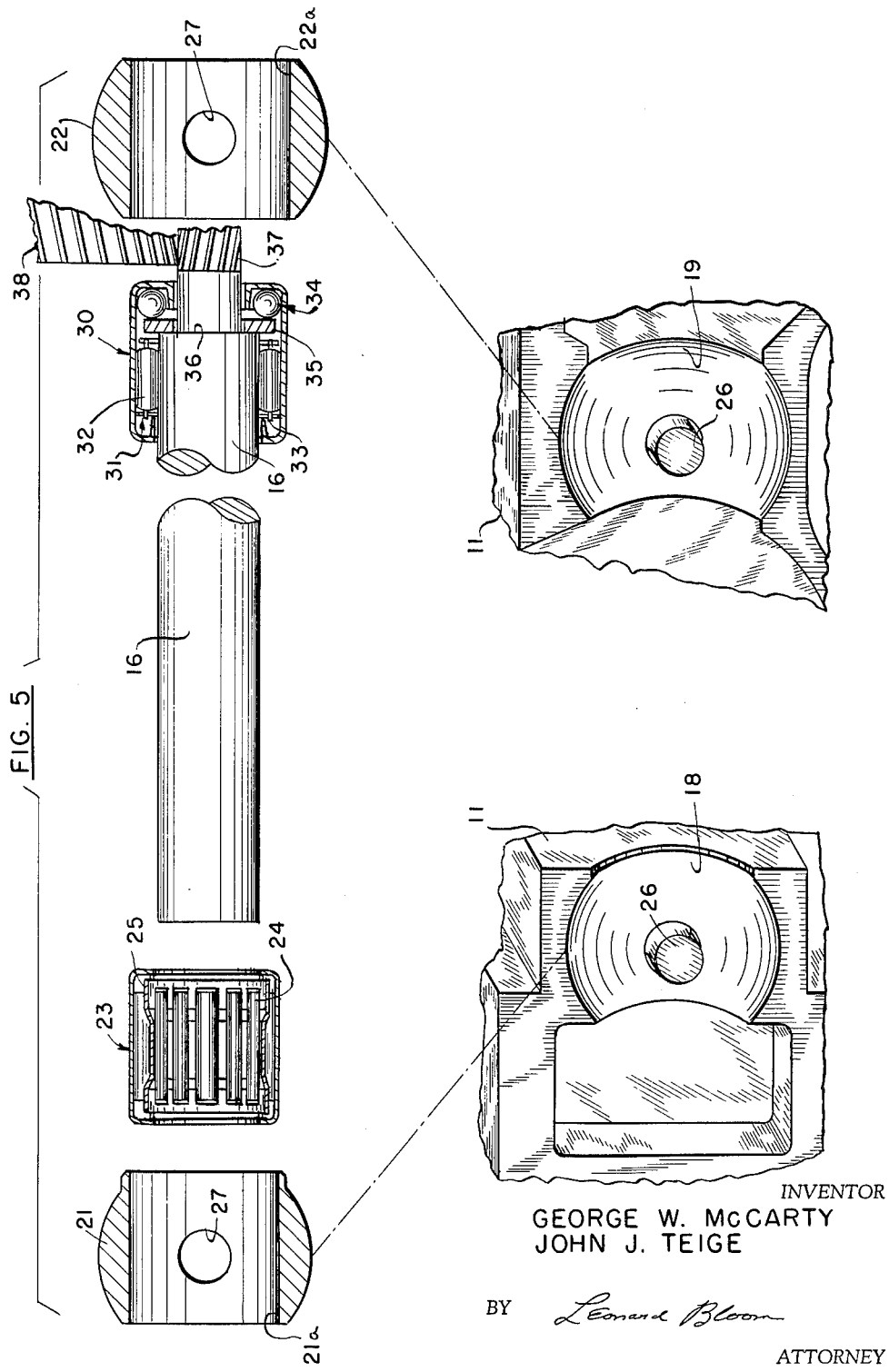
INVENTOR
GEORGE W. McCARTY
JOHN J. TEIGE
BY  *Leonard Bloom*
ATTORNEY

# United States Patent Office 3,203,742
Patented Aug. 31, 1965

3,203,742
BEARING MEANS FOR POWER-OPERATED DEVICE
George W. McCarty, Towson, and John J. Teige, Baltimore, Md., assignors to The Black and Decker Manufacturing Company, Towson, Md., a corporation of Maryland
Filed Dec. 17, 1962, Ser. No. 245,094
1 Claim. (Cl. 308—174)

The present invention relates to bearing means for a power-operated device, and more particularly, to self-aligning roller bearings adapted to be trapped between the mating portions of a split-housing power-operated tool.

In the prior art of which we are aware, various power-operated devices, as for example portable electric tools, have been designed and manufactured which utilize a split-housing, sometimes referred to in the art as a "calm shell" design; the split-housing comprises a pair of complementary mating halves detachably secured together generally along a common longitudinal midplane. One of the mating halves constitutes the "bottom" half of the housing into which the various mechanical and electrical components of the tool are assembled, while the other mating half constitutes the "top" half or cover portion of the housing. In conjunction with such split-housing tools, spaced-apart spherical sleeve bearings are conveniently employed; and these sleeve bearings are trapped within respective spherical bearing seats and between the mating halves of the split-housing as the halves are secured together. The sleeve bearings, being spherical, may shift slightly with respect to the housing so as to compensate for any misalignments between the conventional motor shaft and the housing, that is to say, the spherical sleeve bearings are inherently self-aligning with respect to each other and to the housing so as to obviate any expensive machining of the complementary bearing seats; and thus the combination of the self-aligning spherical bearings and the split-housing design facilitates the rapid manufacture of good quality tools at a relatively-low unit cost to the consumer. For industrial applications, however, where heavy-duty loads are normally encountered for much longer periods of operation, the spherical sleeve bearings are not as durable, nor as reliable, as ball or roller bearings, which, in addition to having higher load bearing capabilities, present less frictional drag on the electric motor for the tool. Roller bearings, on the other hand, require a precision bore machined to close tolerances and into which the bearing is press-fitted or otherwise secured; and hence the use of roller bearings in conjunction with split-housing tools has heretofore been precluded in the art. Moreover, and under certain circumstances, a tool may have already been designed using the conventional concept of a split-housing and self-aligning sleeve bearings of the spherical type, the tool being marketed as a consumer product intended for the home workshop and other general purpose applications; and it is often desirable to design and manufacture a heavier-duty version of the existing tool, one which would be intended for contractors, builders, maintenance and repair shops, and for general industry. Naturally, the existing tool could be redesigned, quite readily, to use roller or ball bearings in lieu of the spherical sleeve bearings, but this redesign would necessitate completely new castings, ones which would have a pair of closely-machined aligned bearing bores formed therein or else use special bearing tolerance rings; the roller bearings would not be inherently self-aligning, and the increased development time and expenses necessarily involved in such a redesign would be undesirable, if not altogether prohibitive in many instances. Although some limited types of self-aligning roller bearings are commercially available, those in which the bearing has an outer spherical surface and is adapted to be included within a large "pillow block" that is in turn mounted to a frame, nevertheless, such self-aligning roller bearings are generally intended for large stationary machinery whose main drive shafts have diameters in the order of several inches or more and are adapted to transmit considerable quantities of power; and hence such bearings are much too large and unwieldy, and also much too expensive, to be implemented in existing designs of hand-portable power-operated tools and related devices.

Accordingly, it is an object of the present invention to provide a hand-portable power-operated device, such as a porable electric jig saw, having a pair of self-aligning roller bearings for journaling the conventional armature shaft.

It is another object of the present invention to readily convert an existing design of a portable electric tool, one which uses spherical sleeve bearings trapped between the complementary mating halves of a split-housing, into a comparable heavy-duty unit using self-aligning roller bearings, without requiring any redesign in the castings for the tool, and without requiring any additional machining of the spherical bearing seats.

It is yet another object of the present invention to provide a universal set of castings for two different versions of the same portable electric tool, one of which uses self-aligning sleeve bearings and is intended for the consumer products market, and the other of which uses self-aligning roller bearings and is intended for heavy-duty industrial applications.

It is a further object of the present invention to facilitate a simple modification in the self-aligning bearings of a relatively low-priced portable electric tool, such as a jig saw, so as to immediately render the existing tool capable of withstanding heavier-duty loads in industrial applications, yet without requiring a substantial investment in new production dies or fixtures; with the result that the heavy-duty tool may be supplied to the ultimate purchaser at a norminal increase in cost.

It is a still further object of the present invention to facilitate the usage of a combination roller bearing and ball thrust bearing assembly in a portable electric tool, wherein the bearing assembly has a internal thrust washer between its roller and ball bearings, and wherein the armature shaft has a shoulder adapted to bear against the thrust washer.

In accordance with the teachings of the present invention, there is herein illustrated a power-operated device, such as a portable electric tool, having a split-housing comprising a pair of mating housing portions detachably secured together. A semi-spherical recess is formed in each of the housing portions, and the recesses cooperate with each other when the housing portions are brought together to form a spherical bearing seat. A self-aligning bearing retainer is disposed in the bearing seat. The bearing retainer has an outer spherical surface which conforms to that of the bearing seat, such that the retainer is trapped in the seat and between the mating housing portions when the housing portions are secured together. Keying means are provided between the bearing retainer and one of the housing portions so as to prevent a rotation of the retainer about its axis; and yieldable means, carried by the other of the housing portions, engages the outer surface of the bearing retainer diametrically-opposite to the keying means. A bearing is secured within the bearing retainer and has a plurality of anti-friction elements, such as rollers, circumferentially-spaced one from another about the axis of the retainer; and a conventional shaft is journaled for rotation within the anti-friction elements of the bearing.

These and other objects of the present invention will become apparent from a reading of the following specification taken in conjunction with the enclosed drawings, in which:

FIGURE 5 is an exploded view of the entire bearing means for the portable electric tool.

Figure 1:
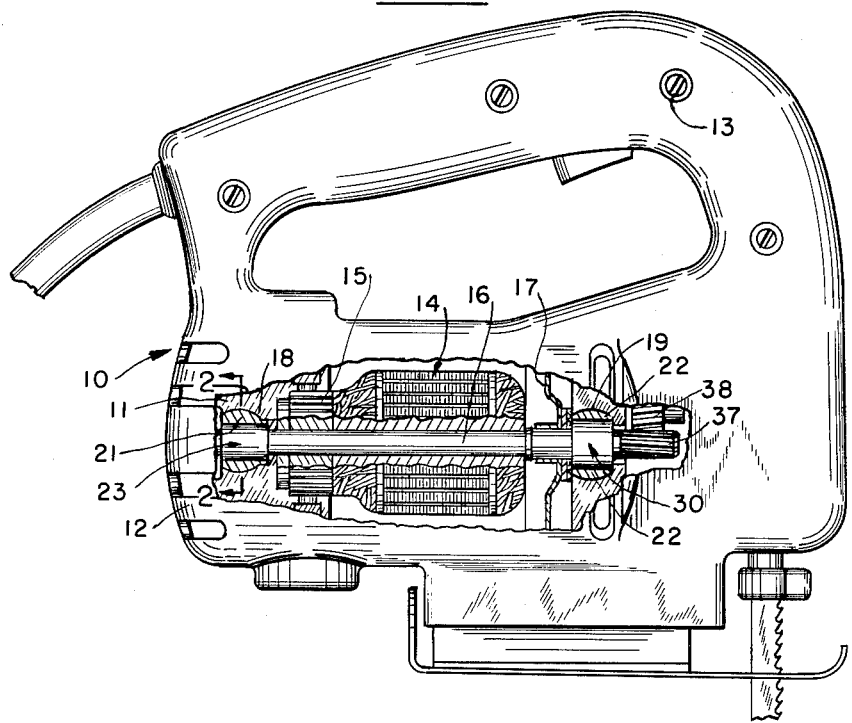
FIGURE 1 is a side elevation of a typical portable electric tool with part of the outer casing being broken away to show the major components of the present invention in elevation or section.

With reference to FIGURE 1, there is illustrated a hand-portable electric jig saw 10 with which the teachings of the present invention may find particular utility, although it is to be appreciated that the present invention is equally applicable to a wide variety of power-operated tools, appliances, and devices and is not necessarily limited to the specific embodiment herein illustrated. With this in mind, the jig saw 10 has a split-housing comprising a pair of complementary mating halves or housing portions, one of which, 11, constitutes the "bottom" half and the other of which, 12, constitutes the "top" half or cover. In the assembly of the jig saw 10, the various electrical and mechanical components are assembled within the bottom half 11, and then the top half 12 is used as a cover and is secured to the bottom half 11 by means of a plurality of screws, one of which is designated as at 13. The jig saw 10 houses a conventional rotating armature 14 which includes a commutator 15 and a shaft 16, and the armature shaft 16 carries a fan 17 for suitably ventilating and cooling the overall unit.

Figure 2:
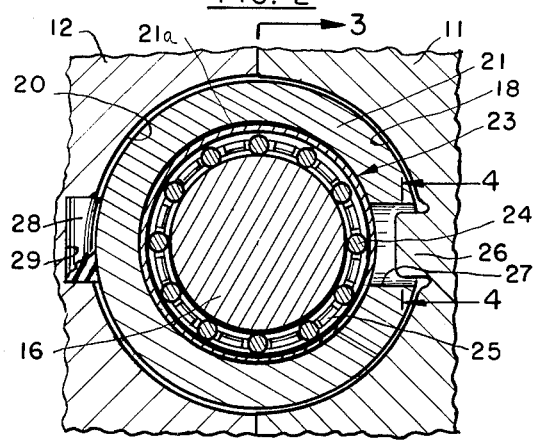
FIGURE 2 is a sectional view taken along the lines 2—2 of FIGURE 1, and enlarged over the scale of FIGURE 1, to show a roller bearing secured within a spherical bearing retainer, the latter being trapped within a spherical bearing seat formed between the complementary mating halves of the split-housing.
Figure 3:
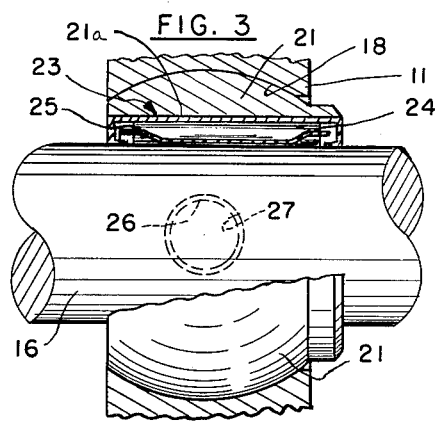
FIGURE 3 is a view taken along the line 3—3 of FIGURE 2, showing one of the rollers in elevation, and further showing the roller cage or carrier in section.

With reference to FIGURES 1, 2, and 3, the bottom mating half 11 has a pair of semi-spherical recesses 18 and 19 formed therein, while the other mating half 12 also has a pair of semi-spherical recesses formed therein, one of which is designated as at 20 in FIGURE 2. When the mating halves 11 and 12 are brought together, the respective pairs of semi-spherical recesses will communicate or cooperate with each other so as to form a pair of spherical bearing seats substantially aligned with each other in the housing. Self-aligning bearing retainers 21 and 22 are disposed within the respective spherical bearing seats. The bearing retainers 21 and 22 have respective axial bores 21a and 22a and further have outer spherical surfaces which closely conform to that of the bearing seats, and the bearing retainers are adapted to be trapped in their respective seats when the mating halves 11 and 12 are joined together. Bearing retainer 21 has a roller bearing 23 secured within its bore 21a by press-fitting or other means; and the roller bearing 23 has a plurality of anti-friction elements, such as the rollers 24, circumferentially-spaced one from another about the axis of the bearing retainer 21 and held together by an annular cage or carrier 25.

Figure 4:
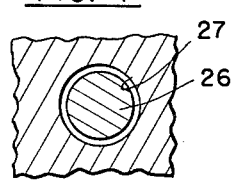
FIGURE 4 is a view taken along the lines 4—4 of FIGURE 2, showing the keying means for preventing a substantial rotation of the bearing retainer about its axis.

With reference to FIGURES 2, 4, and 5, each of the bearing retainers 21 and 22 is trapped in place in its respective seat by the following means: The bottom mating half 11 has a pin 26, preferably cast therein, and adapted to project beyond each of the spherical bearing seats. Pin 26 is loosely received, see FIGURE 4, within a radial hole 27 formed in each of the bearing retainers 21 and 22, with the diameter of the pin being slightly less than that of the radial hole 27. Consequently, the bearing retainers 21 and 22, while being prevented from having a substantial rotation about their axes, will nevertheless be allowed to shift slightly with respect to the housing; and thus the spherically-formed bearing retainer 21 and 22 are self-aligned with respect to each other and to the housing. The combination of the pin 26 and the radial hole 27 provides a keying means between the bearing retainers 21 and 22 and the housing, yet accommodates the self-aligning nature of the spherically-formed retainers. Moreover, top half 12 carries a pair of respective cylindrical plugs 28 of rubber or other resilient material, one of which is shown in FIGURE 2 as being received within a partially-completed cylindrical recess 29; and when the mating halves 11 and 12 are joined together, the resilient plug 28 will be compressed between the top half 12 and the outer surface of the bearing retainer 21. Consequently, a yieldable means is provided, diametrically-opposite to the keying means, so as to assist in the trapping of the spherical bearing retainers within their respective seats.

With reference to FIGURE 5, the bearing retainer 22 is adapted to receive a combination roller bearing and ball thrust bearing assembly 30, which may be press-fitted or otherwise secured within the bore 22a of the bearing retainer 22. The combination bearing assembly 30 comprises a roller bearing 31 having a plurality of circumferentially-spaced anti-friction elements, such as the rollers 32 held in a cage 33, a ball thrust bearing 34, and a thrust washer 35 between the roller and ball bearings. The armature shaft 16 has a step or shoulder 36 which is adapted to bear against one side of the thrust washer 35, and the shaft 16 further has a protruding portion having a pinion 37 of the helical type formed thereon. The helical pinion 37 meshes with a complementary helical gear 38 journaled in the housing, and the rotation of the meshed pinion and gear (being helical and in the direction indicated) provides an axial force or component tending to maintain the shoulder 36 of the armature shaft 16 against the thrust washer 35 of the bearing assembly 30.

The present invention thus facilitates the design and manufacture of a heavy-duty counterpart of a relatively low-priced portable electric tool, and the same castings and basically the same assembly and production techniques may be used for each, without incurring the cost of a new set of castings, and without otherwise resorting to expensive machining operations. The heavy-duty tool employs self-aligning roller bearings having higher load capabilities, and the bearings are still trapped between the complementary mating halves of the split-housing for rapid and economical manufacture. The roller bearings are secured within spherically-formed bearing retainers which are adapted to be received in complementary spherically-formed bearing seats; and it will be appreciated from the drawings that the seats are substantially spherical, being formed as a partially-completed sphere truncated at each end. The anti-friction elements of the bearings are illustrated as rollers, but it will be appreciated that other types of elements, such as needles or balls, could also be used. Also, suitable grease sealing means familiar to one skilled in the art are employed between the pinion 37 and the combination bearing assembly 30, but this means has not been shown in FIGURE 1 for convenience of illustration.

Obviously, many modifications may be made without departing from the basic spirit of the present invention; and accordingly, within the appended claim the invention may be practiced other than has been specifically described.

We claim:

In a power-operated device, the combination of:
(a) a split-housing comprising a pair of complementary mating halves including a bottom half and a top half detachably secured together along a common vertical midplane; said split housing including an internal wall means separating the housing into a motor housing portion and a gear case portion forwardly of said motor housing;

(b) a pair of spaced-apart semi-spherical recesses formed in each of said mating halves, the recesses in one half cooperating with those in the other half, when said halves are brought together, to form a pair of spherical bearings seats alined with each other in said housing, one of said seats being formed in said internal wall means;

(c) a self-aligning bearing retainer in each of said bearing seats;

(d) each of said bearing retainers having an axial bore and further having an outer spherical surface conforming to that of its respective bearing seat and being trapped in its respective seat and between said mating halves as said halves are secured together;

(e) keying means between each of said bearing retainers and said bottom one of said mating halves of said split-housing, preventing a rotation of said retainer about its axis;

(f) resilient means seated within each of said semi-spherical recesses in said top half of said housing portions and engaging said outer surface of each of said bearing retainers diametrically-opposite to said keying means;

(g) a combination roller bearing and ball thrust bearing assembly secured within the bore of said bearing retainer in said internal wall means; said combination bearing assembly comprising a roller bearing, a ball bearing, and a thrust washed between said ball and roller bearings;

(h) a roller bearing secured within the bore of the other of said bearing retainers;

(i) a motor shaft journalled for rotation in said respective roller bearings; said motor shaft having a shoulder in axial bearing engagement with said thrust washer;

(j) said motor shaft further having a reduced diameter portion forwardly of said shoulder; said reduced diameter portion projecting into said gear case and having a helical pinion thereon; and (k) a helical gear mounted for rotation in said gear case on an axis parallel to and radially offset from said motor shaft; said helical gear being in meshing engagement with said pinion, whereby an axial force is generated which constantly urges said shoulder of said motor shaft to bear against said thrust washer.

References Cited by the Examiner

UNITED STATES PATENTS

| | | | |
|---|---|---|---|
| 609,778 | 8/98 | Capewell | 308—212 X |
| 1,694,438 | 12/28 | Chinn | 308—72 |
| 1,778,391 | 10/30 | Kendall | 308—35 |
| 1,792,645 | 2/31 | Larsh | 308—72 |
| 2,063,787 | 12/36 | Brown | 308—174 |
| 2,071,341 | 2/37 | Hufferd. | |
| 2,208,724 | 7/40 | Griswold | 308—174 |
| 2,404,084 | 7/46 | Norton | 308—174 |
| 2,448,500 | 8/48 | Turner | 308—72 |
| 2,469,932 | 5/49 | Ritter. | |
| 2,603,674 | 7/52 | Koch | 308—72 X |
| 2,606,947 | 8/52 | Happe | 310—258 |
| 2,814,747 | 11/57 | Momberg | 310—258 |
| 2,827,340 | 3/58 | Johnson | 308—72 |
| 2,953,401 | 9/60 | Moskovitz. | |
| 3,070,409 | 12/62 | Jakel | 308—72 X |

FOREIGN PATENTS

| | | |
|---|---|---|
| 840,940 | 6/52 | Germany. |
| 282,380 | 2/31 | Italy. |

ROBERT C. RIORDON, *Primary Examiner.*